Dec. 11, 1962  G. C. LUEBKEMAN  3,067,846
EARTH MOUNT
Filed June 2, 1958
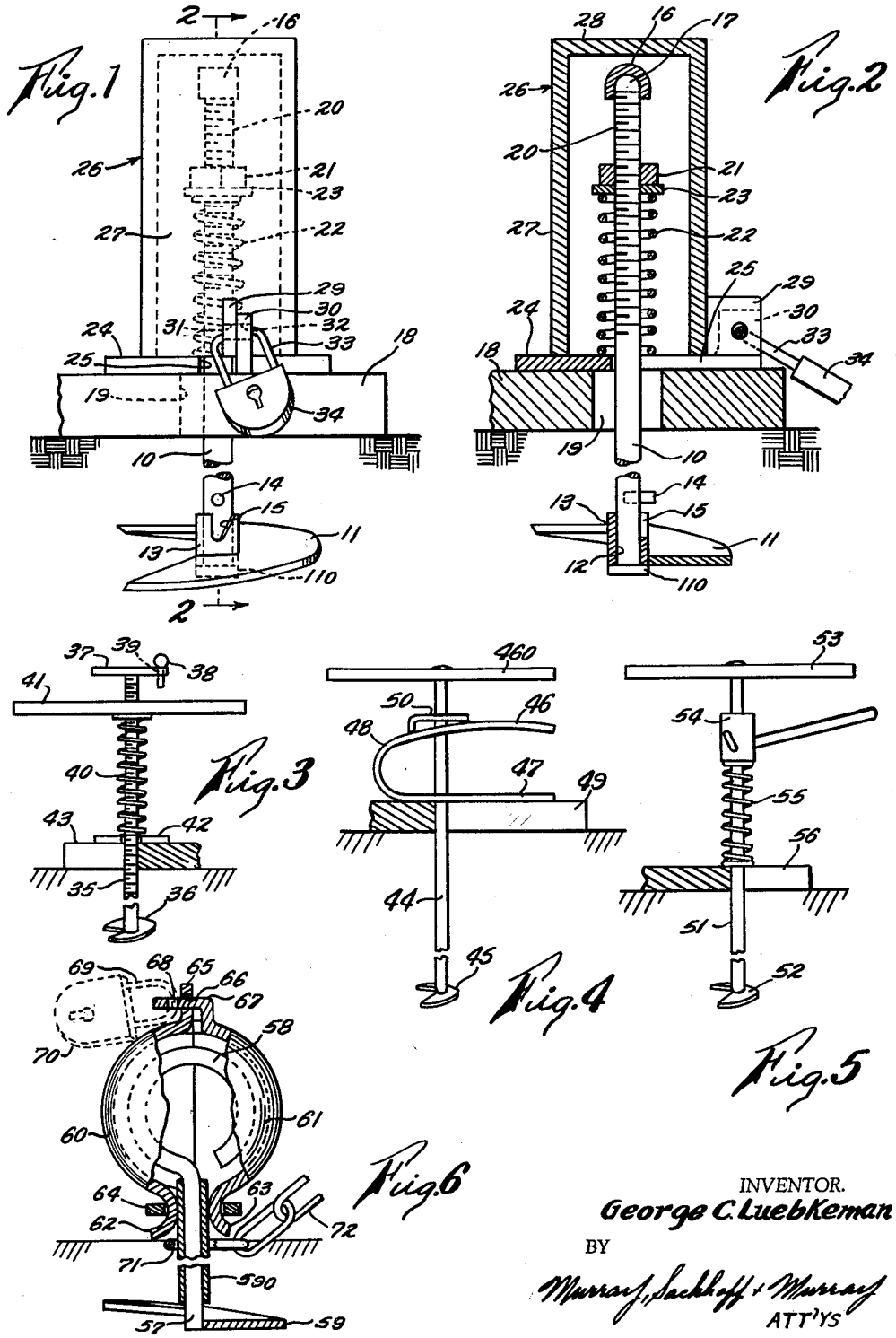
INVENTOR.
George C. Luebkeman
BY
Murray, Sachhoff & Murray
ATT'YS United States Patent Office 3,067,846
Patented Dec. 11, 1962

3,067,846
EARTH MOUNT
George C. Luebkeman, 214 Cherokee Ave.,
Cincinnati, Ohio
Filed June 2, 1958, Ser. No. 739,054
4 Claims. (Cl. 189—91)

The present invention relates to earth or ground mounting devices and is particularly directed to improvements in mounting devices for positioning upon the ground certain portable, movable and other equipment that are subject to displacing forces during operation or use.

Heretofore ground or earth mounts for portable, displaceable machinery and other equipment have been stakes driven in the ground by axially directed blows with an impact instrument, or a so called "dead man" implanted in the ground by digging a hole therein, depositing the "dead man" in the hole and replacing the ground in the hole thereover. Staked, vibratory equipment after short operational periods would loosen in the ground rendering them useless, whilst the employment of a "dead man" was quite expensive especially in circumstances requiring temporary placement of equipment.

The principal object of this invention is to provide an improved earth or ground mount which overcomes the disadvantages of the prior earth mounts.

An earth or ground mount made according to my invention broadly comprises a mounting rod having a screw disk fixed concentrically on the lower end which is advanced with the rod into the earth when they are turned down on their axes by a lever tool connected to the upper end of the rod. An expansile spring encircles the upper end portion of the rod and is adapted to bear against a base portion of the piece of equipment to be anchored to the ground by the mount, a combined spring compressing and holding means being provided on the upper end portion of the rod and engaging the upper end of the spring for resiliently holding the spring in operative contracted position against the equipment base.

With this construction, when the earth and ground mount is in operative condition, the screw disk will be firmly embedded in the earth and will not be dislodged or its position disturbed by sudden vibratory forces set up in or against the equipment since such forces will be damped by the contractile spring disposed between the base of the equipment and the rod carrying the screw disk. Thus the mount provides not only the firmness but the necessary flexibility to prevent the development of looseness in the mount due to settling of the ground under heavy equipment or dislodgment of the screw disk from its place in the ground whilst the mount itself is easily and quickly set up on, removed from or left in the ground, as may be required.

Among the other objects of my invention is the provision in an earth or ground mount of a locking device whereby the mount cannot be removed from the ground or from the piece of equipment with which it is associated by an unauthorized person; the provision of a screw disk structure that may be advanced into the earth around stone or other hard obstructions; and a rod and screw disk uni-directional clutch connection which will prevent removal of the rod from the ground when it is desirable to have a permanent mount installation that is tamper-proof.

These objects and such other objects as will hereinafter appear, or be pointed out, are attained by the illustrative embodiments of my invention shown in the drawing, in which:

FIG. 1 is a fragmental, side elevational view of one embodiment of my invention shown in operative position in the ground for mounting the base of portable machinery or a piece of displaceable equipment thereunder.

FIG. 2 is a section taken on line 2—2 of FIG. 1.

FIGS. 3, 4, and 5 are fragmental, elevational views similar to FIG. 1 each illustrative of a further embodiment of my invention, the equipment bases being shown in section.

FIG. 6 is a fragmental, side elevational view of a further modification of my invention, parts thereof being shown in central section.

In the first embodiment of my invention, as shown in FIGS. 1 and 2, 10 designates a rod of any desirable length that has a screw disk 11 secured in any desirable manner to its lower end such as by a rotatable uni-directional clutch connection which takes the form of a through-hole 12 formed in the hub 13 of the screw disk 11 for freely receiving the lower end of the rod. The rod end portion has a pin 14 projecting laterally therefrom that is received in a ratchet slot 15 formed in the upper end edge of the hub, said slot being positioned to afford a rigid connection between the rod and screw disk when the rod is turned in one rotatory earth advancing direction and to be relatively rotatable when the rod is turned in the counter-rotatory direction relative to the screw disk. Head 110 formed on the end of the rod prevents axial withdrawal from the hub 13 of the screw disk.

The upper end of the rod 10 is provided with an inverted, U-shaped strap 16 welded to opposite sides of the end, a tool receiving hole 17 being formed thereby on the upper end of the rod for the reception of one end of a suitable lever so that the rod may be rotated on its axis. Rotation of the rod in one rotatory direction rotates the screw disk in the earth to advance it into a deep embedded position therein, such advancement carrying the rod into operative position within the earth.

The numeral 18 indicates a part of the base for a ground positioned piece of equipment that is subject to displacing forces, such equipment being identified in part as spring target traps for sportsmen or vibrating separation equipment for stone, sand or the like. As best shown in FIG. 2 this base has an enlarged opening 19 formed vertically therethrough for receiving the upper end portion of the rod 10 after the rod has been rotated to its embedded, fixed position in the earth, said opening being large enough for the passage of the upper end of the rod and its attached parts therethrough.

The upper end of the rod 10 is provided with external screw threads 20 which co-operate with a nut 21 threaded thereto to provide an axially movable means on the upper part of the rod which controls the expansion or contraction of an expansile spring 22 encircling the rod, a suitable washer 23 being interposed between the nut 21 and the upper end of the said spring. A relatively large diameter washer 24 is adapted to rest upon the upper surface of the base 18 and to engage the lowermost coil of the spring 22, said washer having a radial slot 25 that extends from the center thereof out through the disk periphery. It will, therefore, be noted that after the rod is anchored in the earth by the screw disk with the nut and spring loosely positioned on its upper end and the base 18 of the piece of equipment in position on the ground with the rod passed through the hole 19 therein, the washer 24 may be inserted between the spring and the base by passing the rod through the slot. After the parts are in the positions indicated in FIGS. 1 and 2 the nut 21 may be turned down upon the spring 22 to compress it and thus firmly hold the base 18 in fixed position upon the ground.

In installations which are not subject to tampering the foregoing mount functions satisfactorily to anchor a piece of outdoor equipment, or the like, in place upon the ground. If it be desirable that the anchor remain in the ground the unidirectional clutch assembly in FIGS. 1 and 2 should be used as the rod-to-disk connection because when a tool is used to remove the screw, counter-rotation of the rod 10 relative to the disk 11 will force the pin 14 against the inclined wall of the ratchet slot 15 and sever the rotatory connection between the rod and disk, the head 110 preventing axial separation of the said parts.

In installations where a valuable piece of equipment is liable to be removed without authority of the owner I provide the mount with a metal case 26 which has a cylindrical side wall 27 and an inter-connected top wall 28, the case being open at the bottom to fit over the exposed upper parts of the mount. The case is provided with an ear 29 projecting laterally from the lower end portion thereof which co-operates with an ear 30 integral on the washer 24 and extending upwardly from the washer in side-by-side relation with the ear 29 on the case 26. Aligned holes 31 and 32 are formed in the ears 29 and 30, respectively, to receive the hasp 33 of a suitable padlock 34. Unauthorized tampering with the operative mount is, therefore, prevented because access to the nut 21 or the tool receiving hole 17 cannot be had and turning of the case 26 relative to the base will result only in relative rotary movement between the washer 24 and the spring 22.

With reference to FIGS. 3-6 showing modifications of my mount and with particular reference to FIG. 3 the numeral 35 indicates an externally threaded rod that has a screw disk 36 fixed concentrically on its lower extremity as by welding or the like. As most clearly shown in FIG. 6 the screw disks for the devices shown in FIGS. 3-6 do not have pilot or lead points on their lower sides as does the screw disk for the device shown in FIGS. 1 and 2 because I have found that a screw disk without a pilot more readily moves around obstructions whilst it is being rotated by the rod for advancement through the earth.

The upper end of the rod 35 has a disk 37 fixed thereto, said disk carrying near its periphery a vertically movable pin 38 which passes through a hole 39 in the disk body. An expansile spring 40 encircles the upper portion of the rod and has its upper end in position to contact a lever 41 threaded on the rod, whilst its lower end engages a slotted washer 42 which is adapted to engage the upper surface of a base portion 43 that is a part of the piece of equipment to be anchored to the ground by the mount. When it is desired to turn the screw disk 36 into the ground to its operative position the lever 41 is turned on the rod until its upper surface engages the fixed disk 37, it being understood that the pin 38 is pulled out of the disk during movement of the lever against the disk. The pin is thereafter dropped so that it engages the lever and thus forms a fixed connection between the lever and the rod so that rotary force may be exerted by the lever on the rod to advance the screw into the earth. Next the base 43 is slid into operative position upon the rod and the spring is next pulled up against the washer 42 by withdrawing the pin 38 from contact with the lever and then turning the lever down until sufficient compression is built up in the spring to anchor the base to the ground.

In the modified form of the invention shown in FIG. 4 a rod 44 has a screw disk 45 fixed to its lower end while the upper end carries a lever 460 welded or otherwise fixed to that rod extremity. The rod is passed through aligned appertures formed in the legs 46 and 47 of a U-shaped, flat spring 48, the leg 47 of the spring resting upon a base 49 whilst the other leg 46 is engaged by a lock washer of hard steel 50. After the rod has been advanced into its operative position in the ground by the screw disk 45 the base 49 is slid into the position shown in FIG. 4 whereafter the leg 46 is depressed by exerting downward pressure thereon by means of the operator's foot. The washer 50 follows the leg 46 downwardly and because the washer will assume a tilted position on the rod 44 it will lock the spring in its compressed position. To release the mount it is only necessary to again place the weight of the foot on the leg 46 which releases the tilting force on the washer 50 whereafter the washer may be moved axially upwardly on the rod 44 thereby allowing for release of the spring and permitting removal of the base from the mount whereafter the rod is unscrewed out of the earth.

With reference to FIG. 5 the numeral 51 indicates an anchor rod that has the screw disk 52 welded to its lower end whilst a lever 53 is fixed to its upper end. A conventional lever operated jack mechanism 54 is associated with the upper end of said rod and serves when operated to exert compressing force on a spring 55 that encircles the rod and is in contact with the base 56 of a piece of equipment to be anchored to the ground.

Now referring to FIG. 6 a further modification of my invention comprises a straight rod 57 having an eye 58 formed on its upper end and an earth anchoring screw disk 59 fixed to its lower extremity. The means for preventing unauthorized removal of the anchor from its operative position in the ground constitutes an open ended tube 590 which encircles and is loose on the straight rod from the eye 58 to the disk 59 and a pair of cup shaped members 60 and 61 which loosely encase the eye 58 and the upper end of the tube to permit rotation of the eye and tube therein. Each cup member 60 and 61 has a laterally aligned outwardly projecting finger 62 and 63, respectively, formed on its lower end which is inserted into a washer 64 encircling the upper end of the tube 590 and the rod 57 to hold the lower end of the said members in closed confronting relationship. The upper end of the member 60 is provided with an ear 65 having a hole 66 therethrough which receives a finger 67 projecting laterally from the member 61. The finger is provided with an aperture 68 to receive the hasp 69 of a suitable padlock 70 for locking the members together. The reference numeral 71 represents the end link of a chain 72 through which the tube and rod are passed to fasten the chain to the device for preferably tethering a valuable piece of equipment although it will be readily understood that this device could be used as a mount in a manner similar to the devices shown in FIGS. 1-5 of the drawings but without the contractile springs therefor. Thus the case prevents tampering with the eye 58 for removal of the anchor whilst the tube 590 prevents application of a tool such as a pair of pliers or a pipe wrench to the rod 57 by an unauthorized person intent on removing the anchor from the ground.

Having described various embodiments of my invention, for purposes of illustration rather than limitations, what I claim is as follows:

1. An earth anchor comprising a rod, means on the upper end of the rod for rotating it on its axis, a screw member having a hub provided with a central bore for freely receiving the lower end of the rod, a pin projecting from the lower end portion of the rod, a ratchet slot formed in the upper edge of the hub for receiving the pin, and a head on the lower end of the rod for precluding axial withdrawal of the rod from the hub.

2. A unitary mount for anchoring an object upon the ground comprising a rod, a screw member fixed concentrically on the lower end of the rod for advancing the lower rod part into operative position in the ground upon rotation of said rod on its axis, an expansile spring encircling the upper part of the rod, the lower end of said spring being adapted to engage the upper portion of a base member for the object resting upon the ground, a rod rotating lever connection on the upper end of the rod, a force multiplying device encircling and movable longitudinally along the upper end portion of the rod and engaging the upper end of the spring for compressing and holding the spring in compression downwardly upon the base member, and an operating lever connection for the force multiplying device.

3. In a device as set forth in claim 2 characterized by the fact that the force multiplying device is a rotatable element threaded to the upper end of the rod.

4. A unitary mount for anchoring the base portion of an object upon the ground comprising a rod, a screw member fixed concentrically on the lower end of the rod for advancing the lower rod part into operative position in the ground upon rotation of said rod on its axis, a mounting hole formed through the base of the object through which the rod is passed, a base contacting washer having a rod receiving slot formed therethrough, an expansile spring encircling the upper part of the rod and having its lower end in operative engagement with the upper side of the washer, a rod rotating lever connection on the upper terminal end of the rod, a force multiplying device connected to and movable longitudinally along the upper end portion of said rod and engaging the upper end of the spring for compressing and holding the spring in compression downwardly upon the washer, and an operating lever connection for the force multiplying device.

References Cited in the file of this patent

UNITED STATES PATENTS

| | | |
|---|---|---|
| 280,912 | Connolly | July 10, 1883 |
| 283,283 | Romine et al. | Aug. 14, 1883 |
| 839,822 | Dunnington | Jan. 1, 1907 |
| 1,180,982 | Czesnak | Apr. 25, 1916 |
| 1,829,444 | Goebel | Oct. 27, 1931 |
| 2,887,195 | Jackson | May 19, 1959 |